3,310,478
SEPARATION OF ALICYCLIC KETONES AND ALCOHOLS BY EXTRACTIVE DISTILLATION WITH A GLYCOL
Emanuel M. Amir, Baytown, Tex., assignor, by mesne assignments, to Esso Research and Engineering Company, Elizabeth, N.J., a corporation of Delaware
Filed July 10, 1964, Ser. No. 381,668
7 Claims. (Cl. 203—6)

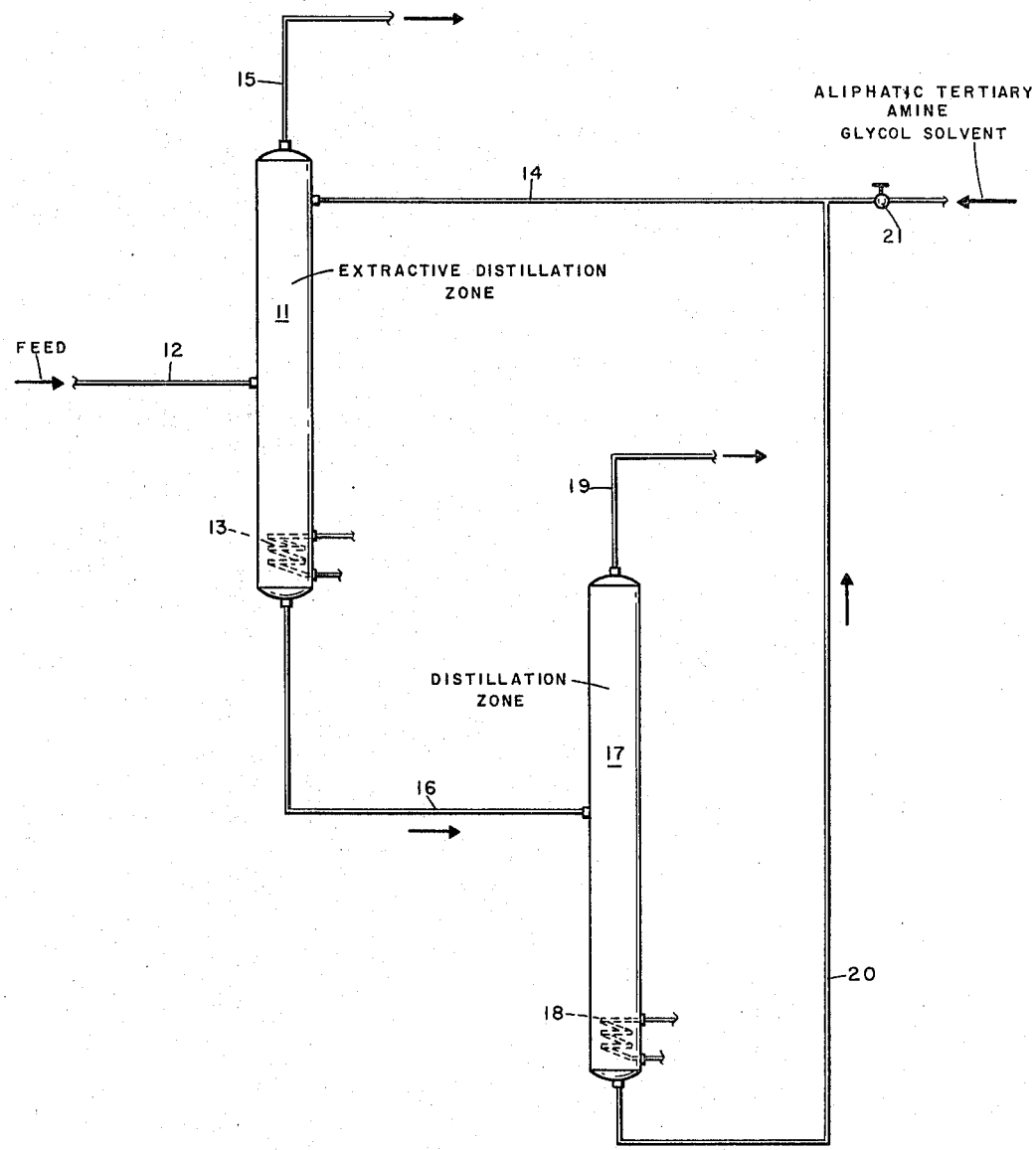

The present invention is directed to a method for separating alicyclic ketones from the corresponding alicyclic alcohols. More particularly, the invention is concerned with the extractive distillation of $C_5$ to $C_{12}$ alicyclic ketones and alcohols. In one of its specific aspects the invention is concerned with separating cyclohexanone from cyclohexanol under extractive distillation conditions with a glycol and an aliphatic tertiary amine.

In the manufacture of alicyclic ketones, whether by autoxidation or by some other process, the final step requires the separation of the alicyclic ketone from its corresponding alicyclic alcohol. It has been extremely difficult from a practical viewpoint to separate the alicyclic ketone in high purities from the corresponding alcohol due to the fact they boil so closely together. The present invention may be briefly described as a method for separating a $C_5$ to $C_{12}$ alicyclic ketone from its corresponding alicyclic alcohol by extractively distilling with a glycol and an aliphatic tertiary amine whereby the alicyclic ketone is obtained as an overhead fraction in high purities.

Attempts have been made heretofore to separate an alicyclic ketone from its corresponding alicyclic alcohol such as the separation of cyclohexanone and cyclohexanol by various processes. It has been found that the relative volatilities (alpha) of a binary mixture, such as cyclohexanone/cyclohexanol, may be increased as the mixture is distilled at reduced pressure, usually at 100–50 mm. Hg. Thus, attempts have been made to distill under the lower pressures to obtain the larger alpha values, but it is obvious that the design and operation of such distillation columns are complicated.

Another problem associated with the separation of the alicyclic ketone from its corresponding alicyclic alcohol is that the alpha value decreases as the relative concentration of the ketone increases. Thus, it is quite difficult to obtain the alicyclic ketone in high purities, especially purities above 99%. This problem of concentration is illustrated by the data in Table I.

TABLE I.—RELATIVE VOLATILITIES—CYCLOHEXANONE/CYCLOHEXANOL

Temperature: 100° C.
Pressure: 225 mm. Hg (approximately)

Cyclohexanone conc. percent: α
50 _____ 1.84
95 _____ 1.83
98 _____ 1.54

It is an object of the present invention to overcome the limitations of past methods for separating alicyclic ketones from the corresponding alicyclic alcohol.

Another object is to separate alicyclic ketones from the corresponding alicyclic alcohol by extractive distillation.

Further, it is an object to extractively distill a mixture of an alicyclic ketone and its corresponding alicyclic alcohol with a glycol and an aliphatic tertiary amine to recover the alicyclic ketone in high purities.

In accordance with the present invention it has been found that glycols are effective extractive distillation solvents for the separation of a $C_5$ to $C_{12}$ alicyclic ketone from its corresponding alicyclic alcohol. The glycols which may be employed in the practice of the present invention are preferably a lower alkyl glycol which may be illustrated by ethylene glycol, propylene glycol, 1,3-propane diol, 1,4-butane diol and 1,5-pentane diol. It has been further found that the dihydroxy compounds are more effective when the hydroxy groups are close together than when separated. Thus, for example, ethylene glycol is more effective than 1,5-pentane diol. The dihydroxy compounds have also been shown to be more effective than any monohydroxy compounds of the same boiling point when compared on equal volume or equal mole basis.

When separating the alicyclic ketone from its corresponding alicyclic alcohol by using a glycol as the extractive distillation solvent alone, it was found that on prolonged heating the glycol reacted with the alicyclic ketone to form dioxaspiro compounds. To illustrate the present invention throughout the specification, cyclohexanol and cyclohexanone will be used. The reaction forming the dioxaspiro compound can be represented accordingly by the following equation using cyclohexanone as an example:

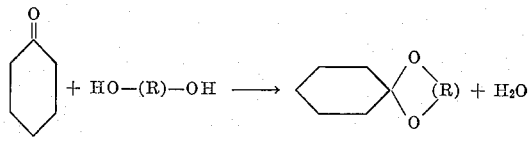

This reaction occurs apparently even when the highest purity alicyclic ketone and glycol are heated. The data in Table II give the results obtained when very pure cyclohexanone was heated with various pure glycols.

TABLE II.—REACTION OF CYCLOHEXANONE WITH DIOLS

Feed: Equal volume of reactants
Temperature: 80° C.

| Diol | Conversion (Wt. percent) [1] | |
|---|---|---|
| | 24 Hrs. | 36 Hrs. |
| Ethylene glycol | 9.1 | |
| Propylene glycol | 27.1 | |
| 1,3-propanediol | 5.5 | 12.4 |
| 1,4-butanediol | | 17.8 |
| 1,5-pentanediol | 2.3 | |

[1] Conversion to dioxaspiro compound.

The addition of an aliphatic tertiary amine to the mixture before separating was found to inhibit the reaction of the alicyclic ketone and diol during the separation such that the alicyclic ketone may be separated from its corresponding alicyclic alcohol effectively and easily under extractive distillation conditions. The aliphatic tertiary amines which may be used according to the invention are illustrated by the following formula:

where R is an alkyl, preferably a lower alkyl such as ethyl, pentyl, propyl, butyl, or a mixture thereof, or substituted alkyls such as alkyl hydroxides and the like.

Specific aliphatic tertiary amines which may be used are tributyl amine, triethanol amine, diethanol butyl amine, dibutyl amyl amine, dipropyl ethanol amine, and the like. The specific aliphatic tertiary amine is selected so as to have a boiling point considerably in excess of the boiling point of the alicyclic alcohol in the separation so that the specific amine remains with the glycol in the separation of the glycol and alicyclic alcohol.

The importance of an aliphatic tertiary amine is shown by comparing the conversion when an aromatic tertiary amine is used as the inhibitor. The selection of the amine is shown in the data of Table III.

TABLE III

Reactants:
15 ml. cyclohexanone
15 ml. ethylene glycol
1 ml. amine
Temperature: 100° C.

| Reaction time | Percent conversion [1] | | | |
| --- | --- | --- | --- | --- |
| | Quinoline | Dimethyl-aniline | Triethanol amine | Tributyl amine |
| 5 hours | 17.9 | 21.8 | | 0.0 |
| 6 hours | | | 0.0 | 0.0 |
| 7 hours | | | | 0.4 |
| 24 hours | 40.0 | 35.0 | 2.2 | 1.7 |

[1] Conversion to dioxaspiro compound.

The inhibitor or aliphatic tertiary amine is used in less than 10 volume percent concentration with the glycol.

The present invention will be further illustrated by reference to the drawing in which the sole figure is a schematic flow diagram illustrating a simple extractive distillation unit according to the present invention.

Referring now to the drawing, a feed mixture consisting of a $C_5$ to $C_{12}$ alicyclic ketone and its corresponding alicyclic alcohol is introduced into extractive distillation zone 11 by feed line 12. The mixture is illustrated by a mixture of cyclohexanone and cyclohexanol. The extractive distillation zone 11 is a distillation tower provided with internal vapor-liquid contacting means such as bell cap trays or other equivalent means. Extractive distillation zone 11 is also provided with means (not shown) for controlling reflux and the reintroduction of the reflux back into the tower and auxiliary condensing and cooling means. Further, the extractive distillation zone 11 is provided with means illustrated by steam coil 13 to control the conditions within the tower. The glycol solvent, which may be ethylene glycol, and an aliphatic tertiary amine, such as triethanol amine, is introduced by line 14 in countercurrent flow to the distillation zone. An overhead fraction which is enriched in the alicyclic ketone, namely cyclohexanone, is withdrawn by line 15. The bottoms fraction is recovered by line 16 which is enriched in the alicyclic alcohol, cyclohexanol. The bottoms fraction is discharged by line 16 into distillation zone 17 which may be a simple distillation column containing internal vapor-liquid contacting means such as bell cap trays and the like. The distilliation zone 17 is equipped in the usual manner with means for inducing reflux, providing auxiliary condensing and cooling and further provided with internal heating means illustrated by steam coil 18. In the distillation zone 17 a simple distillation of the glycol and amine and the alicyclic alcohol takes place. The alicyclic alcohol fraction, in the case of cyclohexanol, is recovered by line 19, while the solvent, ethylene glycol, and amine, triethanol amine, are recovered by line 20. The solvent and amine are circulated through line 20 into line 14 for reintroduction into the extractive distillation zone 11. Makeup amine and/or solvent either singly or as a mixture may be introduced into line 14 by opening valve 21. The extractive distillation zone 11 may be maintained under a wide range of operating conditions depending on the specific glycol employed and the specific alicyclic ketone-alcohol mixture being separated. The extractive distillation, according to the present invention, is carried out to obtain purities of the desired alicyclic ketone at above 98%; and accordingly, the temperature of the overhead fraction is essentially that of the boiling point of the alicyclic ketone at the operating pressure. Pressures employed are usually atmospheric; however, subatmospheric or superatmospheric pressures may be employed. The extractive distillation is preferably carried out at a solvent-to-hydrocarbon ratio of about 1:1 but may be within the range of about 1:10 to about 10:1.

The present invention is further illustrated by the separation of 50–50 mixtures of cyclohexanone and cyclohexanol with various glycols according to the present invention. It is found that the most effective glycol is ethylene glycol as shown in Table IV.

TABLE IV.—RELATIVE VOLATILITIES

Feed:
12.5 ml. cyclohexanone
12.5 ml. cyclohexanol
25.0 ml. diol
2.0 ml. tri-n-butylamine
Temperature: 100° C.

| Diol: | Relative volatility |
| --- | --- |
| Ethylene glycol | 2.37 |
| Propylene glycol | 2.13 |
| 1,3-propanediol | 2.09 |

The increase in the relative volatility such as to enable the separation according to the present invention is illustrated by the data in Table V.

TABLE V

Feed:
24.5 ml. cyclohexanone
0.5 ml. cyclohexanol
Inhibitor: tri-n-butylamine
Solvent: ethylene glycol
Temperature: 100° C.

| Solvent, ml. | Inhibitor, ml. | α |
| --- | --- | --- |
| None | None | 1.54 |
| None | 2 | 1.51 |
| 5 | 2 | 1.73 |
| 10 | 2 | 2.25 |

The importance of the present information is illustrated by the data set forth above in that it shows that an alicyclic ketone may be obtained from a mixture of the alicyclic ketone and alcohol. Further, it is shown that the relative volatility is increased according to the present invention sufficiently to make possible a good separation under vapor-liquid separating conditions. The particular alicyclic ketones in purified conditions are known important chemicals and are useful either as chemicals or in the manufacture of other materials.

The nature and objects of the present invention having been completely described and illustrated and the best mode thereof contemplated set forth:

What I wish to claim as new and useful and secure by Letters Patent is:

1. A method for separating a $C_5$ to $C_{12}$ alicyclic ketone from its corresponding alicyclic alcohol which comprises contacting a mixture of said alicyclic ketone and alcohol in an extraction zone under extractive distillation conditions with a glycol and an aliphatic tertiary amine to form an overhead fraction and a bottoms fraction, and recovering said alicyclic ketone as said overhead fraction.

2. A method for separating a $C_5$ to $C_{12}$ alicyclic ketone from its corresponding alicyclic alcohol which comprises contacting a mixture of said alicyclic ketone and alcohol in an extraction zone under extractive distillation conditions with ethylene glycol and an aliphatic tertiary amine to form an overhead fraction and a bottoms fraction, and recovering said alicyclic ketone as said overhead fraction.

3. A method for separating a $C_5$ to $C_{12}$ alicyclic ketone from its corresponding alicyclic alcohol which comprises contacting a mixture of said alicyclic ketone and alcohol in an extraction zone under extractive distillation conditions with a glycol and dialkyl ethanolamine to form an overhead fraction and a bottoms fraction, and recovering said alicyclic ketone as said overhead fraction.

4. A method for separating a $C_5$ to $C_{12}$ alicyclic ketone from its corresponding alicyclic alcohol which comprises contacting a mixture of said alicyclic ketone and alcohol in an extraction zone under extractive distillation conditions with a glycol and alkyl diethanolamine to form an overhead fraction and a bottoms fraction, and recovering said alicyclic ketone as said overhead fraction.

5. A method for separating cyclohexanone from cyclohexanol which comprises contacting a mixture of said cyclohexanone and cyclohexanol in an extractive distillation zone under extractive distillation conditions with a glycol and an aliphatic tertiary amine to form an overhead fraction and a bottoms fraction, and recovering cyclohexanone as the overhead fraction in high purities.

6. A method for separating cyclohexanone from cyclohexanol which comprises contacting a mixture of said cyclohexanone and cyclohexanol in an extractive distillation zone under extractive distillation conditions with ethylene glycol and tributylamine to form an overhead fraction and a bottoms fraction, and recovering cyclohexanone as the overhead fraction in high purities.

7. A method for separating cyclohexanone from cyclohexanol which comprises contacting a mixture of said cyclohexanone and cyclohexanol in an extractive distillation zone under extractive distillation conditions with ethylene glycol and triethanolamine to form an overhead fraction and a bottoms fraction, and recovering cyclohexanone as the overhead fraction in high purities.

References Cited by the Examiner

UNITED STATES PATENTS

| | | | |
|---|---|---|---|
| 2,444,006 | 6/1948 | Dannenberg | 260—593 |
| 2,476,554 | 7/1949 | Lincoln et al. | 260—593 |
| 2,822,409 | 2/1958 | Gwynn et al. | 203—6 |
| 2,974,174 | 3/1961 | Edmiston | 260—631 |

NORMAN YUDKOFF, *Primary Examiner.*

WILBUR L. BASCOMB, JR., *Examiner.*